US006997767B2

(12) United States Patent
Taniguchi et al.

(10) Patent No.: US 6,997,767 B2
(45) Date of Patent: Feb. 14, 2006

(54) METHOD FOR MANUFACTURING A SPARK PLUG, AND SPARK PLUG

(75) Inventors: Yutaka Taniguchi, Aichi (JP); Masahide Sumi, Gifu (JP); Akio Sakura, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 68 days.

(21) Appl. No.: 10/400,390

(22) Filed: Mar. 28, 2003

(65) Prior Publication Data

US 2004/0189169 A1 Sep. 30, 2004

(51) Int. Cl.
*H01T 21/02* (2006.01)
*B23K 26/00* (2006.01)

(52) U.S. Cl. .......................... 445/7; 313/118; 313/141; 219/121.64

(58) Field of Classification Search ................ 313/118, 313/141; 445/7; 219/121.63, 121.64
See application file for complete search history.

(56) References Cited

U.S. PATENT DOCUMENTS

| | | | | |
|---|---|---|---|---|
| 4,681,396 | A * | 7/1987 | Jones | 385/33 |
| 5,272,309 | A * | 12/1993 | Goruganthu et al. | 219/121.63 |
| 5,320,569 | A | 6/1994 | Oshima et al. | |
| 5,859,942 | A * | 1/1999 | Ueda | 385/49 |
| 6,533,628 | B1 * | 3/2003 | Matsutani | 445/7 |
| 6,636,535 | B1 * | 10/2003 | Iwashita et al. | 372/6 |

FOREIGN PATENT DOCUMENTS

| | | | |
|---|---|---|---|
| EP | 1 049 222 | B1 | 7/2002 |
| JP | 06-045050 | | 2/1994 |
| JP | 10-112374 | | 4/1998 |
| JP | 2001-015245 | | 1/2001 |
| JP | 2002003235 | A * | 1/2002 |

* cited by examiner

*Primary Examiner*—Karabi Guharay
*Assistant Examiner*—Sikha Roy
(74) *Attorney, Agent, or Firm*—Dennison, Schultz, Dougherty & MacDonald

(57) ABSTRACT

A method for manufacturing a spark plug which reduces the generation of spatters and the possibility of insufficient weld strength resulting from penetration depth insufficiency of a weld metal portion is disclosed. In accordance with the method, a chip joint face formation portion of a center electrode is formed from a heat-resistant alloy predominantly containing Fe or Ni. A noble metal chip is attached to a chip joint face of the chip joint face formation portion to thereby form a chip-attached assembly. A full-circled laser-beam weld metal portion is formed on the chip-attached assembly in such a manner as to intrude into the noble metal chip and into the chip joint face formation portion. A graded-index-type fiber optic cable is used as an optical transmission path extending between a laser beam generator and an optical emission section. A laser beam which is transmitted from the laser beam generator through the cable irradiates the chip-attached assembly while being condensed.

18 Claims, 10 Drawing Sheets

METHOD FOR MANUFACTURING A SPARK PLUG, AND SPARK PLUG

FIELD OF THE INVENTION

The present invention relates to a method for manufacturing a spark plug and to a spark plug and more particularly to a method for manufacturing a spark plug wherein a noble metal chip is laser-beam welded to an electrode and to a spark plug manufactured by such method.

BACKGROUND FOR THE INVENTION

In order to enhance spark ablation resistance of a spark plug used for providing ignition in an internal combustion engine, one type of spark plug employs a noble-metal spark portion formed by means of welding a noble metal chip to a distal end of an electrode that is formed from a Ni- or Fe-based heat resistant alloy. The noble metal chip predominantly contains Pt, Ir, or the like.

A method for joining a noble-metal chip to the distal end face of a center electrode to form a spark discharge gap in cooperation with an opposed ground electrode, includes the step of making a full-circled laser-beam weld. For example, see Japanese Patent Application Laid-Open (kokai Nos. H06-45050 and H10-112374). According to the method disclosed therein, a disk like noble metal chip is attached to the distal end face (a chip joint face) of the center electrode, and the boundary between the chip and the electrode is irradiated with a laser beam while the center electrode is being rotated, thereby forming a full-circled laser-beam weld metal portion.

The above-mentioned method for manufacturing a spark plug employs a pulsed laser beam emitted from a YAG laser or the like for welding a noble metal chip to an electrode. To form a laser-beam weld metal portion along the circumference of the noble metal to intrude into the noble metal chip and into a chip joint face formation portion of the electrode, the parameters of the pulsed laser beam such as irradiation energy per pulse and the pulse width are determined while being correlated to the material, outside diameter, and the like of the noble metal chip and electrode. This is done to prevent the formation of a blowhole or the like within the weld metal portion.

When a full-circled laser-beam weld metal portion 10 is formed after a noble metal chip 31' is attached to an electrode (e.g., a center electrode) 3, a method for attaining a sufficient weld strength between the electrode 3 and the noble metal chip 31'; i.e., a sufficient depth of the weld metal portion, is to irradiate a pulsed laser beam. The pulsed laser-beam is enhanced in laser peak intensity per pulse through reduction of the pulse width, as shown in FIG. 13(*a*). However, when the weld metal portion 10 intrudes into a chip joint face formation portion of the electrode 3 and into the noble metal chip 31' as formed by use of a laser beam whose laser peak intensity per pulse is enhanced simply through reduction of the pulse width, spatters (slag and metal particles that spatter during welding) SP are apt to be generated. They are apt to be generated since the amount of heat input by the laser beam is made small as a result of low thermal conductivity of a Ni- or Fe-based heat-resistant alloy used to form the electrode. The thus-generated spatters SP may adhere to the noble metal chip 31' or the electrode 3 to thereby damage their appearance or impair product yield or in some cases generate a defect such as depression or hole in the electrode.

As the laser peak intensity increases, the weld metal width w of the weld metal portion 10 increases; thus, the distance as measured along the axial direction of the center electrode 3 between the peripheral edge of a discharge face 31*a* and the corresponding end edge of the weld metal portion 10; i.e., the spark portion thickness h, decreases. As a result, even slight ablation of a noble-metal spark portion 31 is apt to involve exposure of the weld metal portion 10 at the discharge face 31*a* of the noble-metal spark portion 31. Generally, the weld metal portion 10 is formed from an alloy of a noble metal chip material and an electrode material and is inferior to a sole noble metal chip in terms of spark ablation resistance. Therefore, the progress of ablation of the exposed weld metal portion 10 leads to the expansion of the spark discharge gap in a relatively short period of time. As a result, a problem such as misfire arises; i.e., a problem of impaired durability of the spark portion 31 arises.

When, the laser peak intensity per pulse is reduced by increasing the pulse width as shown in FIG. 13(*b*) while the total irradiation energy within a predetermined time (e.g., in one second) in FIG. 13(*a*) is held unchanged, heat input to the electrode 3 tends to be accumulated. But, in some cases the penetration depth d of the weld metal portion 10—which is formed in such a manner as to intrude into a chip joint face formation portion of the electrode 3 and into the noble metal chip 31'—may be insufficient. As a result, the weld strength may be insufficient, or an oxide scale SC (an oxide layer developed in the boundary between the center electrode 3, the noble metal chip 31', and the weld metal portion 10) may develop in the course of long-term use. The ratio ds/D between the radial depth ds of an oxide scale and the chip diameter D is called the oxide scale development rate. In some cases the noble metal chip 31' may come off.

In view of the foregoing, an object of the present invention is to provide a method for manufacturing a spark plug which reduces the generation of spatters and the possibility of insufficient weld strength resulting from penetration depth insufficiency of a weld metal portion or the development of an oxide scale resulting from long-term use, as well as to provide a spark plug having high durability of a spark portion which cannot be attained by a conventional method.

BRIEF SUMMARY OF THE INVENTION

In essence, the present invention contemplates a method for manufacturing a spark plug which includes the step of providing a noble metal chip, a center electrode and a ground electrode. The center electrode includes a distal end face and the ground electrode includes a side surface that faces the distal end face of the center electrode. The noble metal chip is then laser-beam-welded to the center electrode or the ground electrode at a position corresponding to a spark discharge gap to form a noble-metal spark portion having a discharged face. The method is characterized by forming a chip joint face portion on one of the electrodes from a heat-resistant alloy that predominately contains Ni- or fe- and attaching the noble metal chip to the chip joint face to form a chip attached assembly. In addition, the method includes the step of providing a laser beam generator and a grated-index-type fiber optic cable having a core and an optical emission section. Then, a full circle laser-beam weld metal portion is formed on the chip attached assembly along a circumferential direction of the noble metal chip. The full circle laser beam weld metal portion is formed in a manner to intrude into the noble metal chip and into the chip joint face formation portion without reaching the discharge face with respect to a thickness direction. This is done by irradiating the chip attached assembly with a laser beam generator transmitting a laser beam through the core of the fiber optic cable and emissions section while condensed by the optical emission section.

To achieve the above object, the present invention provides a method for manufacturing a spark plug comprising a center electrode and a ground electrode, which is arranged so that a side surface thereof faces the distal end face of the center electrode. A noble metal chip is laser-beam-welded to at least the center electrode or the ground electrode at a position corresponding to a spark discharge gap to form a noble-metal spark portion having a discharge face. The method is characterized by forming a chip joint face portion on the center electrode and/or the ground electrode from a heat-resistant alloy. The heat resistant alloy predominantly contains Ni or Fe, and the noble metal chip is attached to the chip joint face to thereby form a chip-attached assembly.

In order to form a full-circled laser-beam weld metal portion on the chip-attached assembly along the circumferential direction of the noble metal chip, a laser beam emitted from a laser beam generator is caused to enter a graded-index-type fiber optic cable. In this way, the weld portion intrudes into the noble metal chip and into the chip joint face formation portion without reaching the discharge face with respect to the thickness direction of the noble metal chip. The laser beam is transmitted to an optical emission section through the core of the fiber optic cable, and irradiated to the chip-attached assembly while being condensed in the optical emission section.

According to the present invention, a graded-index-type (hereinafter referred to as "GI-type") fiber optic cable is used as an optical transmission path extending between the laser beam generator and the optical emission section, from which a laser beam transmitted from the laser generator through the cable irradiates the chip-attached assembly while being condensed. The refractive index of the core of the GI-type fiber optic cable continuously changes in the radial direction, thereby increasing the energy density of a laser beam as measured in the vicinity of the optical axis (center). That is, the core's refractive index distribution correlates to the energy distribution (power distribution) of a laser beam that irradiates the chip-attached assembly from the optical emission section.

Through alignment of the optical axis (center) of a laser beam with a laser beam target position (portion) at which the laser-beam weld metal portion intrudes into a chip joint face formation portion of the electrode and into the noble metal chip, the weld metal portion can assume a required penetration depth more readily than in the case of formation by a conventional method. Also, a portion of a laser beam corresponding to a peripheral portion of the core, which has low refractive index irradiates the electrode, which is formed from a Ni- or Fe-based heat-resistant alloy. As a result, the amount of heat input by the laser beam is small because of low thermal conductivity. Since this portion of a laser beam is low in energy distribution, spattering is suppressed.

Increasing the center level of energy distribution of a laser beam by use of a GI-type fiber optic cable enables the formation of a weld metal portion having a narrow width, thereby relatively increasing the thickness of a spark portion. Thus, the weld metal portion is unlikely to be exposed at the discharge face of the noble-metal spark portion, thereby enhancing the spark ablation resistance of the spark portion.

In contrast to a step-index-type (hereinafter referred to as "SI-type") fiber optic cable whose core is formed from pure quartz, a GI-type fiber optic cable has a core to which germanium is added. In the case of the SI-type fiber optic cable, a laser beam is transmitted through the core while repeating total reflections from the boundary surface between the core and cladding, whereas, in the case of the GI-type fiber optic cable, a laser beam is transmitted through the core while light rays of the laser beam repeatedly converge along curved lines on each of predetermined points on the axis of the core as if light rays passing through a lens converged on the focal point of the lens. Therefore, light rays of the laser beam which pass through different portions of the core of the GI-type fiber optic cable arrive at the optical emission section at substantially the same time; i.e., without time delay. Thus, the GI-type fiber optic cable allows the signal waveform of an incident laser beam to be maintained intact in the course of transmission over a long distance.

A laser beam which has been transmitted through and emitted from the GI-type fiber optic cable is condensed by means of a group of spherical-aberration correction lenses provided in the optical emission section, thereby reducing the laser beam spot diameter (focal point diameter). The diameter reduction of a laser beam reduces the size of an optical-axis (center) portion of the laser beam irradiated to an electrode portion formed from an Ni- or Fe-based heat-resistant alloy, thereby further suppressing spattering. Also, a reduction of the laser beam spot diameter (focal point diameter) leads to a further reduction in the width of the weld metal portion and a further increase in the thickness of the spark portion, whereby the weld metal portion is unlikely to be exposed at the discharge face of the noble-metal spark portion, thereby further enhancing the spark ablation resistance of the spark portion.

The group of spherical-aberration correction lenses is a plurality of lenses that are combined so as to correct spherical aberration (aberration such that light rays of a laser beam impinging on a lens are refracted in the course of passing through the lens and intersect the optical axis at different positions in accordance with the distances of the corresponding incident points from the optical axis). Through use of this group of spherical-aberration correction lenses, the laser beam spot diameter can be reduced to not greater than 0.6 mm. When the laser beam spot diameter is in excess of 0.6 mm, the energy density of the laser beam as measured in the vicinity of the optical axis drops, potentially resulting in insufficient weld strength resulting from insufficient penetration depth of the weld metal portion.

The above-mentioned laser beam can be irradiated to the chip-attached assembly in a pulsing form at an irradiation energy per pulse of 0.5–2.5 J and a pulse width of 3–8 milliseconds. Where the chip joint face formation portion of the electrode is formed from a heat-resistant alloy predominantly containing Fe or Ni,and a noble metal chip is attached to the chip joint face of the chip joint face formation portion to form a chip-attached assembly, and where a full-circled laser-beam weld metal portion is formed on the chip-attached assembly in such a manner as to intrude into the noble metal chip and into the chip joint face formation portion, increasing the pulse width of a pulsed laser beam having an irradiation energy per pulse of 0.5–2.5 J to, for example, 2–6 milliseconds can suppress laser peak intensity to a low level, thereby reducing the generation of spatters and suppressing an increase in the width of the weld metal portion.

When the pulse width is less than 3 milliseconds or when irradiation energy per pulse is less than 0.5 J, the amount of heat input per pulse is small, resulting in insufficient formation of a fused portion. When irradiation energy per pulse is less than 0.5 J, and the pulse width is less than 3 milliseconds, the amount of heat input per pulse becomes too small; as a result, when the electrode is formed from, for example, an Ni- or Fe-based heat-resistant alloy, the electrode is hardly fused as a result of heat release through the electrode, thereby causing difficulty in forming a weld metal portion.

When irradiation energy per pulse is in excess of 2.5 J or when the pulse width is in excess of 8 milliseconds, heat input by the laser beam tends to be accumulated as a result of low heat release through the electrode formed from a Ni- or Fe-based heat-resistant alloy. Thus, the penetration depth and the weld metal width increases. In other words, the dimension of a non-weld-metal portion after welding; i.e., the thickness of the spark portion, decreases, so that even slight ablation of the noble-metal spark portion is apt to involve exposure of the weld metal portion at the discharge face of the noble-metal spark portion. Also, the electrode may be deformed as a result of fusion. When irradiation energy per pulse is in excess of 2.5 J, and the pulse width is in excess of 8 milliseconds, fused metal may evaporate or spatter, so that a defect (blowhole) such as a depression or hole may be formed in the electrode.

More preferably, irradiation energy per pulse is 0.8–1.5 J, the pulse width is 4–7 milliseconds, and the laser beam spot diameter is not greater than 0.5 mm.

In the practice of the present invention, irradiation energy per pulse is obtained, for example, in the following manner. Before laser beam welding is performed, a laser beam is emitted from a laser beam generator and is received by an energy detector such as a calorimeter or power meter so as to measure irradiation energy per unit time (e.g., per second), and the thus-obtained irradiation energy is divided by the number of pulses per second. The laser beam spot diameter is obtained, for example, in the following manner. Before laser beam welding is performed, carbon paper is irradiated with a laser beam, and the diameter of the resultant hole formed through burning is measured.

The above-mentioned laser beam is irradiated to the chip-attached assembly in a pulsing form at a pulse frequency of 2–30 pulses/sec, whereby a full-circled laser-beam weld metal portion having high uniformity can be formed at high efficiency.

When the laser beam is generated at a pulse frequency less than 2 pulses/sec, efficiency in formation of a full-circled laser-beam weld metal portion cannot be enhanced. When the laser beam is generated at a pulse frequency in excess of 30 pulses/sec, heat input to the electrode by the laser beam is accumulated excessively, potentially resulting in nonuniform penetration depth or nonuniform weld strength.

Therefore, to achieve the aforementioned object, the present invention provides a spark plug comprising a center electrode and a ground electrode, which is arranged such that a side surface thereof faces a distal end face of the center electrode. A noble metal chip is laser-beam-welded to at least the center electrode or the ground electrode at a position corresponding to a spark discharge gap so as to form a noble-metal spark portion having a discharge face. The spark plug is characterized in that at least a chip joint face formation portion of the center electrode and/or the ground electrode is formed from a heat-resistant alloy predominantly containing Ni or Fe.

A full-circle laser-beam weld metal portion is formed along the circumferential direction of the noble metal chip attached to the chip joint face, in such a manner as to intrude into the noble metal chip and into the chip joint face formation portion without reaching the discharge face with respect to the thickness direction of the noble metal chip.

On a section of the noble-metal spark portion including the axis thereof, d/w is adjusted to greater than 0.55, where d represents the penetration depth of the full-circled laser-beam weld metal portion, and w represents the weld metal width of the full-circled laser-beam weld metal portion.

In the spark plug of the present invention, the full-circled weld metal portion is formed along the outer circumferential surface of the noble metal chip such that the ratio d/w between the penetration depth d and the weld metal width w is adjusted to greater than 0.55. As a result, the weld metal width w is relatively decreased, whereas the penetration depth d is relatively increased. The ratio d/w can be adjusted to greater than 0.55 through reduction of the laser beam spot diameter to not greater than 0.6 mm in laser beam welding. Such reduction of the laser beam spot diameter can be implemented by use of, for example, the following configuration. A GI-type fiber optic cable is used as an optical transmission path extending from a laser beam generator to an optical emission section and a laser beam condenser consisting of a group of spherical-aberration correction lenses.

Forming a weld metal portion having a relatively narrow weld metal width w means that the spark portion remains relatively thick even after welding. Thus, when the chip thickness H defined as the dimension of the noble metal chip measured on the outer circumferential surface of the chip along the axial direction of the center electrode, and the spark portion thickness h is defined as the shortest distance between the peripheral edge of the discharge face and the corresponding end edge of the full-circled laser-beam weld metal portion, h/H can be adjusted to not less than 0.50. In this case, ablation of the noble-metal spark portion is unlikely to involve exposure of the weld metal portion at the discharge face of the noble-metal spark portion. Therefore, accelerated ablation of the spark portion, which would otherwise result from the exposure of the weld metal portion, is suppressed, thereby enhancing the durability of the spark portion and thus extending the service life of the spark plug.

When the ratio d/w between the penetration depth d and the weld metal width w is not greater than 0.55, and/or the ratio h/H between the spark portion thickness h after welding and the chip thickness H before welding is less than 0.50, the weld metal width w is relatively increased (or the penetration depth d is relatively decreased), and the spark portion thickness h is relatively decreased. As a result, even slight ablation of the noble-metal spark portion is apt to involve exposure of the weld metal portion at the discharge face of the noble-metal spark portion, or the weld strength is apt to become insufficient.

BRIEF DESCRIPTION OF THE DRAWINGS

FIG. 1(*b*) is an enlarged view showing a main portion of the spark plug shown in FIG. 1;

FIG. 2(*b*) is a perspective view which illustrates a process for manufacturing a spark plug in accordance with one embodiment of the present invention;

FIG. 2(*c*) is a cross sectional view which illustrates a process for manufacturing a spark plug in accordance with another embodiment of the invention;

FIG. 3(*b*) illustrates a method for measuring a laser beam spot diameter;

FIG. 4(*b*) illustrates an SI-type fiber optic cable;

FIG. 5(*b*) is an enlarged perspective view of a distal end portion of a center electrode;

FIG. 5(*c*) is a sectional view showing a distal end portion of a center electrode of a spark plug including a metal weld portion;

FIG. 5(*d*) is a sectional view showing a modified example of the distal end portion of the center electrode.

FIG. 6(*b*) is a top view that further illustrates the manufacturing process of FIG. 6(*a*);

FIG. 10(*b*) is a sectional view showing the main portion of the spark plug shown in FIG. 10(*a*);

FIG. 10(*c*) is a sectional view showing a modified example of the main portion of the spark plug shown in FIG. 10(*a*);

FIG. 12(*b*) is a second schematic view that illustrates a process for manufacturing the ground electrode of FIG. 11;

DESCRIPTION OF THE PREFERRED EMBODIMENTS OF THE INVENTION

Figure 1A:
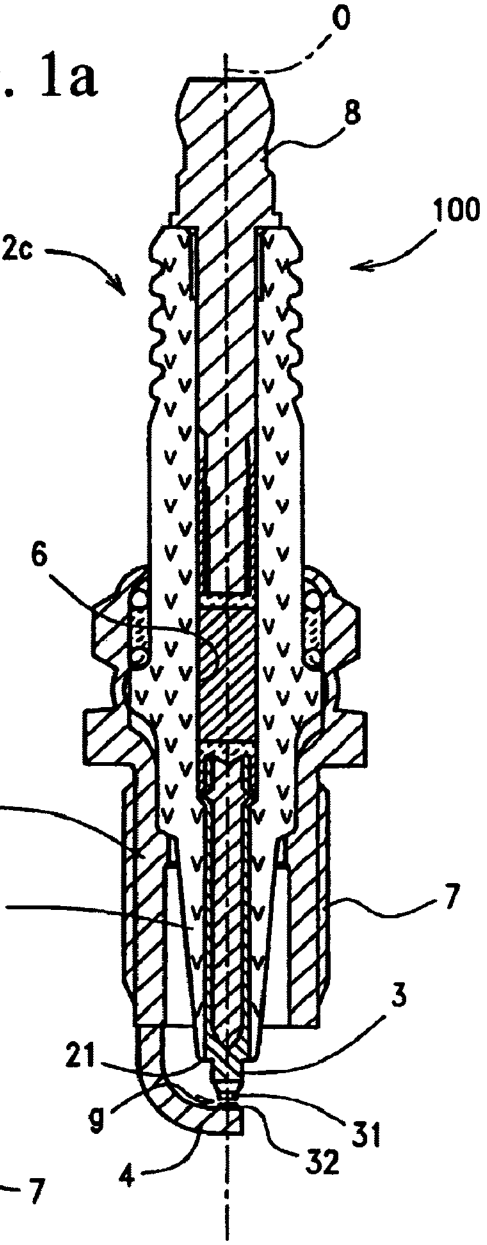
FIG. 1(*a*) is a vertical sectional view showing an embodiment of a spark plug of the present invention.
Figure 1B:
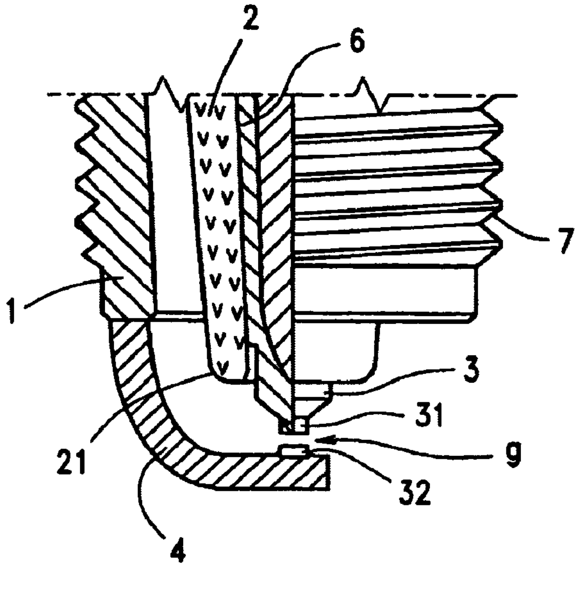

The preferred embodiments of the present invention will now be described in connection with the accompanying drawings. Referring now to FIG. 1, a spark plug 100 includes a tubular metallic shell 1, an insulator 2 fitted into the metallic shell 1 so that its distal end portion 2 projects from the metallic shell 1. A center electrode 3 is disposed inside the insulator 2 so that a noble-metal spark portion (hereinafter sometimes referred to as a "spark portion") 31 formed at its distal end projects from the insulator 2. A ground electrode 4 includes one end joined to the metallic shell 1 by means of welding or a like process and a second end portion bent such that the side surface thereof faces a distal end portion of the center electrode 3. A noble-metal spark portion 32 is formed on the ground electrode 4 in such a manner as to face the spark portion 31. The gap between the opposed spark portions 31 and 32 serves as a spark discharge gap 9.

Herein, the "spark portion" denotes a portion of a welded noble metal chip that is free from a change in composition induced by welding (e.g., a portion remaining after removing a portion which is alloyed with a ground electrode material or a center electrode material by welding).

The insulator 2 is formed from a ceramic sintered body such as alumina or aluminum nitride. The insulator 2 has a passageway or hole portion 6 formed therein in such a manner as to extend along its axial direction. The center electrode 3 and a metallic terminal member 8 are fitted into the hole portion 6. The metallic shell 1 is formed into a cylindrical shape from a metal such as low-carbon steel. The metallic shell 1 serves as a housing of the spark plug 100 and has a male-threaded portion 7 formed on its outer circumferential surface. The spark plug 100 is attached to an engine block (not shown) or cylinder head by means of the male-threaded portion 7.

Either one of the opposed spark portions 31 and 32 may be eliminated. In this case, the spark discharge gap g is formed between the spark portion 31 and the side surface of the ground electrode 4 which does not have a spark portion or between the spark portion 32 and the distal end face of the center electrode 3 which does not have a spark portion.

A chip joint face formation portion of the center electrode 3 and a chip joint face formation portion of the ground electrode 4 are formed from a heat-resistant alloy predominantly containing Ni or Fe, at at least their surface layer parts. In the present embodiment, the term "main component" (as well as the phrase "formed predominantly from" or "predominantly containing") means that the component is contained at the highest weight content, but "not necessarily at 50% by weight or higher"). Heat-resistant alloys that predominantly contain Ni or Fe and are usable in the present invention are shown below.

(1) Ni-based heat-resistant alloy is used as a generic term for heat-resistant alloys which contain Ni in an amount of 40%–85% by weight and at least one component selected from the group consisting of Cr, Co, Mo, W, Nb, Al, Ti, and Fe, which accounts for the balance. Specifically, the following alloys (mentioned by trade name; for detailed composition, refer to Metal Data Book, 3rd Edition, Maruzen, p138) are usable:

ASTROLOY, CABOT 214, D-979, HASTELLOY C22, HASTELLOY C276, HASTELLOY G30, HASTELLOY S, HASTELLOY X, HAYNES 230, INCONEL 587, INCONEL 597, INCONEL 600, INCONEL 601, INCONEL 617, INCONEL 625, INCONEL 706, INCONEL 718, INCONEL X750, KSN, M-252, NIMONIC 75, NIMONIC 80A, NIMONIC 90, NIMONIC 105, NIMONIC 115, NIMONIC 263, NIMONIC 942, NIMONIC PE11, NIMONIC PE16, NIMONIC PK33, PYROMET 860, RENE 41, RENE 95, SSS 113MA, UDIMET 400, UDIMET 500, UDIMET 520, UDIMET 630, UDIMET 700, UDIMET 710, UDIMET 720, UNITEP AF2-1DA6, WASPALOY.

(2) Fe-based heat-resistant alloy is used herein as a generic term for heat-resistant alloys which contain Fe in an amount of 20%–60% by weight and at least one component selected from the group consisting of Cr, Co, Mo, W, Nb, Al, Ti, and Ni, which accounts for a predominant portion of the balance. Specifically, the following alloys (mentioned by trade name; for detailed composition, refer to Metal Data Book, 3rd Edition, Maruzen, p138) are usable:

A-286, ALLOY 901, DISCALOY, HAYNES 556, INCOLOY 800, INCOLOY 801, INCOLOY 802, INCOLOY 807, INCOLOY 825, INCOLOY 903, INCOLOY 907, INCOLOY 909, N-155, PYROMET CTX-1, PYROMET CTX-3, S-590, V-57, PYROMET CTX-1, 16-25-6, 17-14CuMo, 19-9DL, 20-Cb3.

The spark portion 31 and the opposed spark portion 32 are formed predominantly from a noble metal predominantly containing Ir or Pt. Use of these noble metals imparts good ablation resistance to the spark portion even in an environment wherein the temperature of the center electrode is apt to increase. Also, use of these noble metals imparts good weldability to the spark portion in welding to the above-mentioned heat-resistant alloys. Examples of usable Pt-based noble metals include Pt, Pt—Ni alloys (e.g., Pt-1%–30% by weight Ni alloy), Pt—Ir alloys (e.g., Pt-1%–20% by weight Ir alloy), and Pt—Ir—Ni alloys. Examples of usable Ir-based noble metals include Ir—Ru alloys (e.g., Ir-1%–30% by weight Ru alloy), Ir—Pt alloys (e.g., Ir-1%–10% by weight Pt alloy), and Ir—Rh alloys.

An Ir-based noble metal material if used can contain an oxide (including a composite oxide) of a metal element belonging to Group 3A (so-called rare-earth elements) and Group 4A (Ti, Zr, and Hf) in an amount of 0.1%–15% by weight. Addition of such an oxide can effectively suppress oxidation and volatilization of an Ir component, thereby enhancing spark ablation resistance of a spark portion. Examples of oxides that can be used include $Y_2O_3$, $La_2O_3$, $ThO_2$, and $ZrO_2$. The Ir component can be an Ir alloy or Ir.

Figure 2:
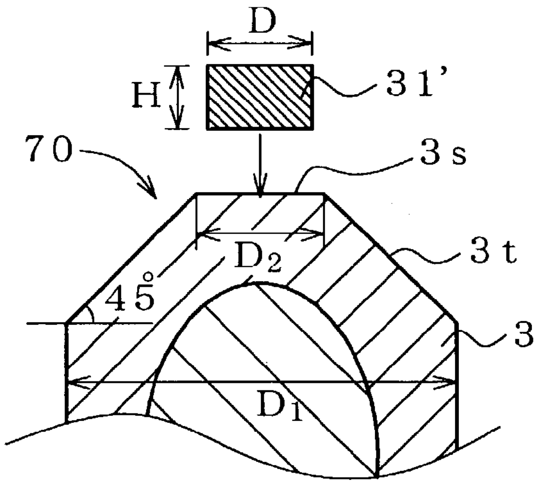
FIG. 2(*a*) is across sectional view illustrating a process for manufacturing the spark portion of the center electrode of the spark plug of FIG. 1.
Figure 2:
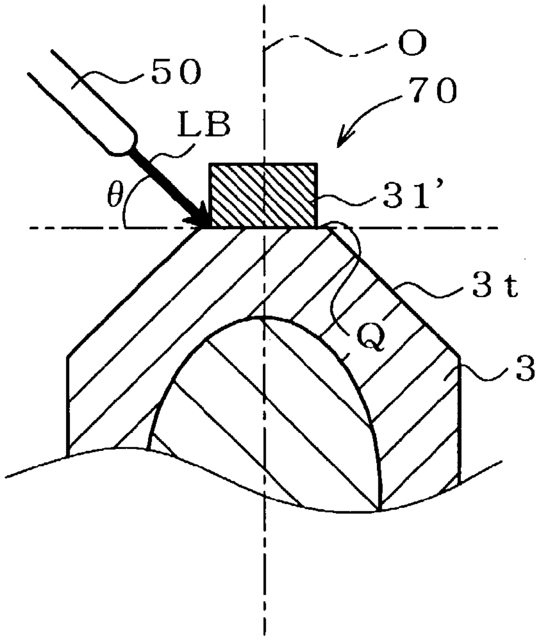
Figure 2:
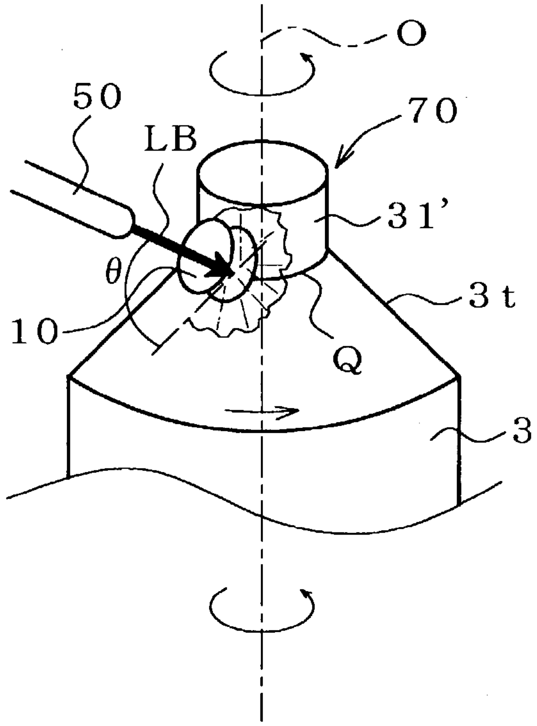

As shown in FIG. 2, a distal end portion of the center electrode 3 is in the form of a truncated cone with a reduced diameter toward the distal end along a tapered surface 3t. A disklike noble metal chip 31', which has the above-mentioned alloy composition of the spark portion 31, is attached to a distal end face 3*s* of the center electrode 3. A full-circled laser-beam weld metal portion (hereinafter may be referred to as a weld metal portion) 10 is formed by means of laser beam welding along the peripheral edge of the boundary between the noble metal chip 31' and the center electrode 3, thereby joining the noble metal chip 31' to the center electrode 3 and forming the spark portion 31. The spark portion 32, which faces the spark portion 31, is formed in the following manner.

Figure 12:
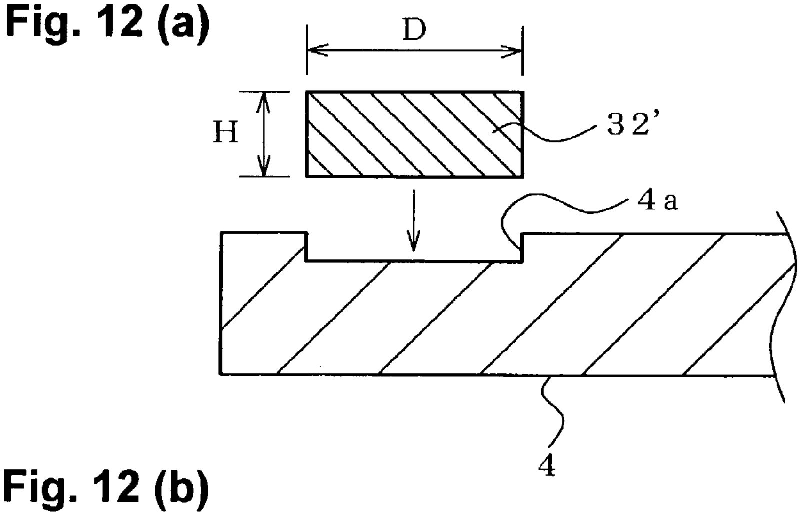
FIG. 12(*a*) is a schematic view that illustrates a process for manufacturing the ground electrode of FIG. 11.
Figure 12:
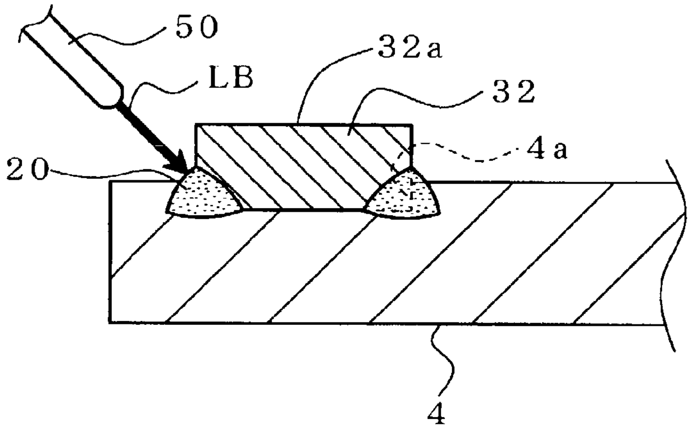

A noble metal chip 32' is positioned on the ground electrode 4 and aligned with the spark portion 31, as shown in FIG. 12. A weld metal portion 20 is formed similarly along the peripheral edge of the boundary between the noble metal chip 32' and the ground electrode 4 to thereby join the noble metal chip 32' to the ground electrode 4.

The chips are formed in the following manner. Alloy components are mixed in a predetermined composition, followed by melting to obtain an alloy. The thus-obtained alloy is hot-rolled into a plate; and the plate is subjected to hot blanking to obtain chips having a predetermined shape. Alternatively, the alloy is hot-rolled or hot-forged into a wire-like or rodlike material, which is then cut into chips each having a predetermined length. Also, the alloy may be formed into spherical chips by an atomization process or the like. The chips 31' and 32' have, for example, a diameter D of 0.4–1.2 mm and a thickness H of 0.5–1.5 mm.

Since the spark portions 31 and 32 are formed by substantially the same method, only one method will be described in detail i.e. a method for forming the spark portion 31 of the center electrode 3. As shown in FIG. 2(*a*), the distal end face 3*s* of the center electrode 3 serves as a chip joint face, and the noble metal chip 31' having the chip diameter D and the chip thickness H is attached to the distal end face 3*s*, thereby forming a chip-attached assembly 70. The full-circled laser-beam weld metal portion 10 is formed along the outer circumferential direction of the noble metal chip 31' in such a manner as to intrude into the noble metal chip 31' and into the chip joint face and not to reach a discharge face 31*a* with respect to the thickness direction of the noble metal chip 31'.

When, as in the case of the present embodiment, the noble metal chip 31' assumes a disklike shape, as shown in FIG. 2(*b*), the chip-attached assembly 70 composed of the noble metal chip 31' and the center electrode 3, and an optical emission section 50 of a laser beam irradiation unit 200 (see FIG. 3) are rotated about an axis O of the chip 31' (the center electrode 3), the chip-attached assembly 70 is irradiated with the pulsed laser beam LB. In this way, the boundary edge Q between the chip joint face (in this case, the distal end face of the center electrode 3) and the outer circumferential surface of the noble metal chip 31' falls within a spot of the pulsed laser beam LB and such that the irradiation angle θ with respect to the chip joint face is −5° to +60° (the sign of an angle formed above the horizontal is +; e.g., +45°). This is one method for uniformly forming the above-mentioned full-circled laser-beam weld metal portion 10. In this case, either the chip-attached assembly 70 or the optical emission section 50 may be rotated, or both of them may be rotated (e.g., in opposite directions).

Preferably, the rotational speed is adjusted as described below. When only a single optical emission section 50 is used as shown in FIG. 2, the relative rotational speed between the chip-attached assembly 70 and the optical emission section 50 is not lower than 10 rpm (preferably not lower than 120 rpm). In order to perform full-circled laser beam welding, the chip-attached assembly 70 and the optical emission section 50 must be rotated relatively to each other at least one rotation. When the relative rotational speed is lower than 10 rpm, full-circled welding time increases, thereby potentially increasing the piece time; i.e., time required for manufacturing a single spark plug. When the chip-attached assembly 70 is to be rotated, the upper limit of the relative rotational speed is preferably about 240 rpm in order to prevent deformation of a molten metal which could otherwise result from a centrifugal force induced during welding.

Next, the configuration of the laser beam irradiation unit 200 will be described with reference to FIG. 3. The laser beam irradiation unit 200 includes a laser beam generator 40 for emitting the pulsed laser beam LB; an optical emission section 50 for irradiating the pulsed laser beam LB toward the outer circumferential surface of the chip-attached assembly 70; and an optical transmission path 60 for transmitting the pulsed laser beam LB from the laser beam generator 40 to the optical emission section 50. In the laser beam generator 40, when a YAG rod 41 formed from a yttrium-aluminum-garnet monocrystal is irradiated with light rays of xenon or the like emitted from an excitation lamp 42, the light rays go back and forth between a total reflector 43 and an outlet-side semitransparent mirror 44 to thereby be amplified into a laser beam, which is released through the outlet-side semitransparent mirror 44. The pulsed laser beam LB is waveform-shaped during passing through a pulse generation circuit (not shown) and then changes directions upon impingement on an outlet reflector 45 of the laser beam generator 40. Subsequently, the pulsed laser beam LB enters the optical transmission path 60 formed of a GI-type fiber optic cable 61. The pulsed laser beam LB is transmitted through and emitted from the GI-type fiber optic cable 61. Then, the emitted laser beam LB is condensed, so as to reduce a laser beam spot diameter df, by means of a group of spherical-aberration correction lenses 51 of the optical emission section 50, and irradiated toward the outer circumferential surface of the chip-attached assembly 70.

The group of spherical-aberration correction lenses 51 is a plurality of lenses that are combined so as to correct spherical aberration (aberration such that light rays of a laser beam impinging on a lens are refracted in the course of passing through the lens and intersect the optical axis at different positions in accordance with the distances of the corresponding incident points from the optical axis). The group of spherical-aberration correction lenses 51 plays an important role in reducing the laser beam spot diameter df to not greater than 0.6 mm (preferably not greater than 0.5 mm).

The GI-type fiber optic cable 61, which serves as the optical transmission path 60, includes a core 62 having a high refractive index; a cladding 63, which has a refractive index lower than that of the core 62 and concentrically cover the core 63; and a plastic jacket 64, which covers the cladding 63. In contrast to an SI-type fiber optic cable 61' (see FIG. 4(*b*)) whose core 62' is formed from pure quartz, the GI-type fiber optic cable 61 has a core 62 to which germanium is added. In the SI-type fiber optic cable 61', the refractive index K' of the core 2' changes stepwise in the radial direction; thus, a laser beam LB' is transmitted through the core 62' while repeating total reflections from the boundary surface between the core 62' and the cladding 63' (FIG. 4(*b*)). In the GI-type fiber optic cable 61, the refractive index K of the core 62 changes continuously in the radial direction; thus, the laser beam LB is transmitted through the core 62 while light rays of the laser beam LB repeatedly converge along sine curves on each of predetermined points on the axis of the core 62 (FIG. 4(*a*)).

Thus, in the GI-type fiber optic cable 61, light rays of the laser beam LB which pass through different portions of the core 62 arrive at an emission end at substantially the same time; i.e., without time delay. In the SI-type fiber optic cable 61', light rays of the laser beam LB which form a greater angle with respect to the core axis exhibit a longer transmission distance in the core 62; therefore, transmission time varies. That is, the GI-type fiber optic cable 61 allows the signal waveform of the incident laser beam LB to be maintained intact in the course of transmission over a longer distance. As a result, the energy density of the laser beam LB as measured in the vicinity of the optical axis is higher.

Figure 3:
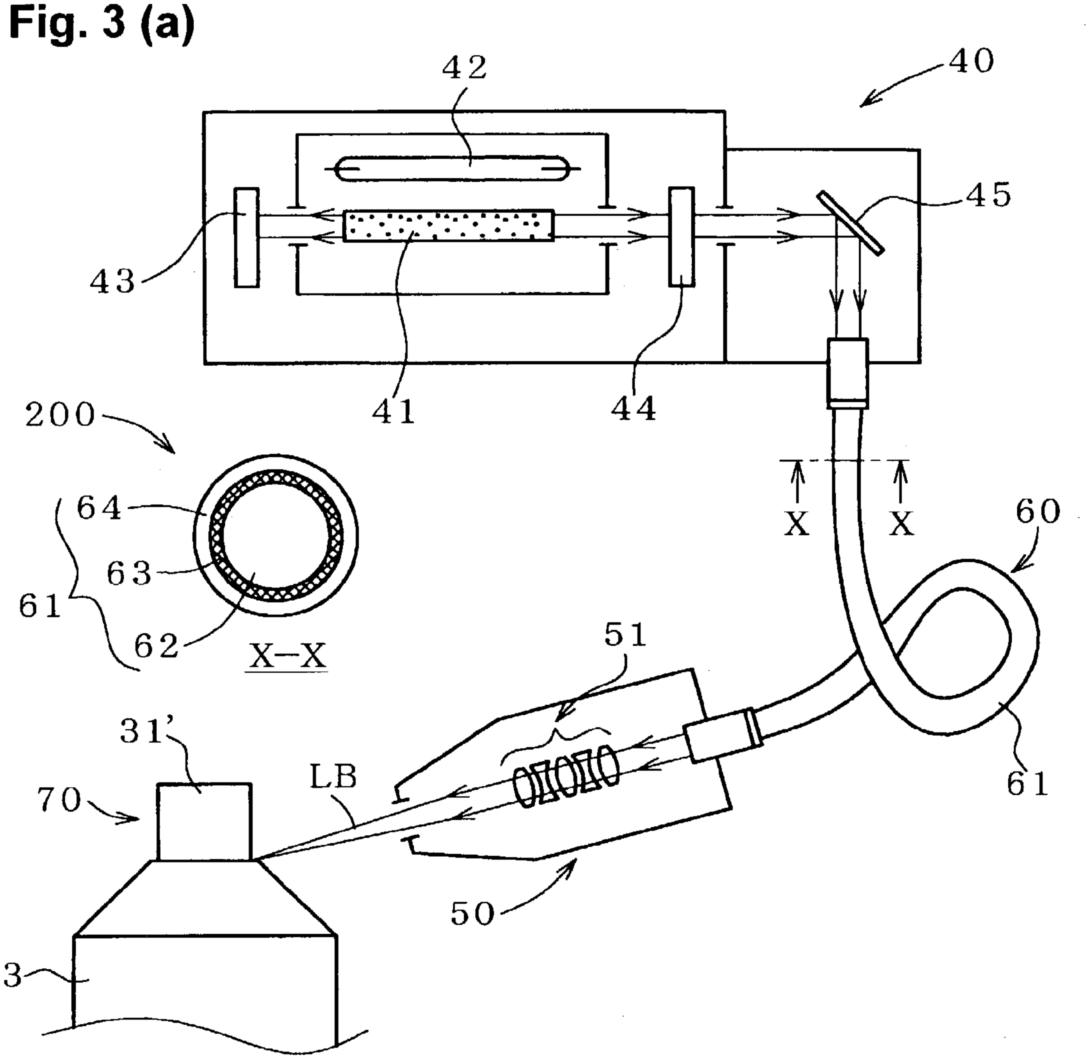
FIG. 3(*a*) is an explanatory view showing a laser beam irradiation unit.
Figure 3:
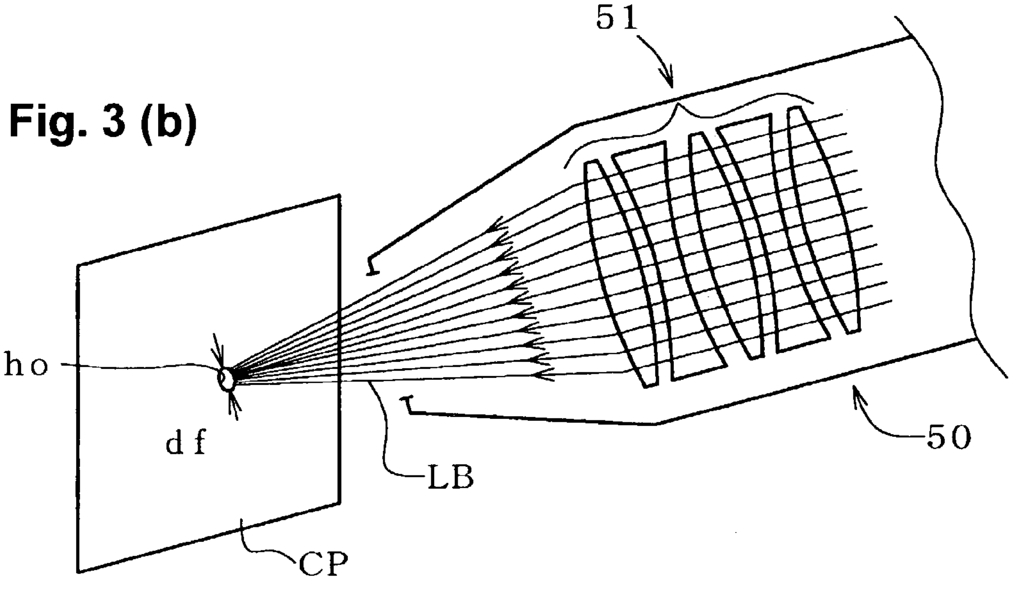

The laser beam spot diameter df can be obtained, for example, in the following manner: as shown in FIG. 3(*b*). Before laser beam welding is performed, carbon paper CP is irradiated with the laser beam LB emitted from the optical emission section 50 of the laser beam irradiation unit 200, and the diameter of the resultant hole ho formed through burning is measured.

Figure 5:
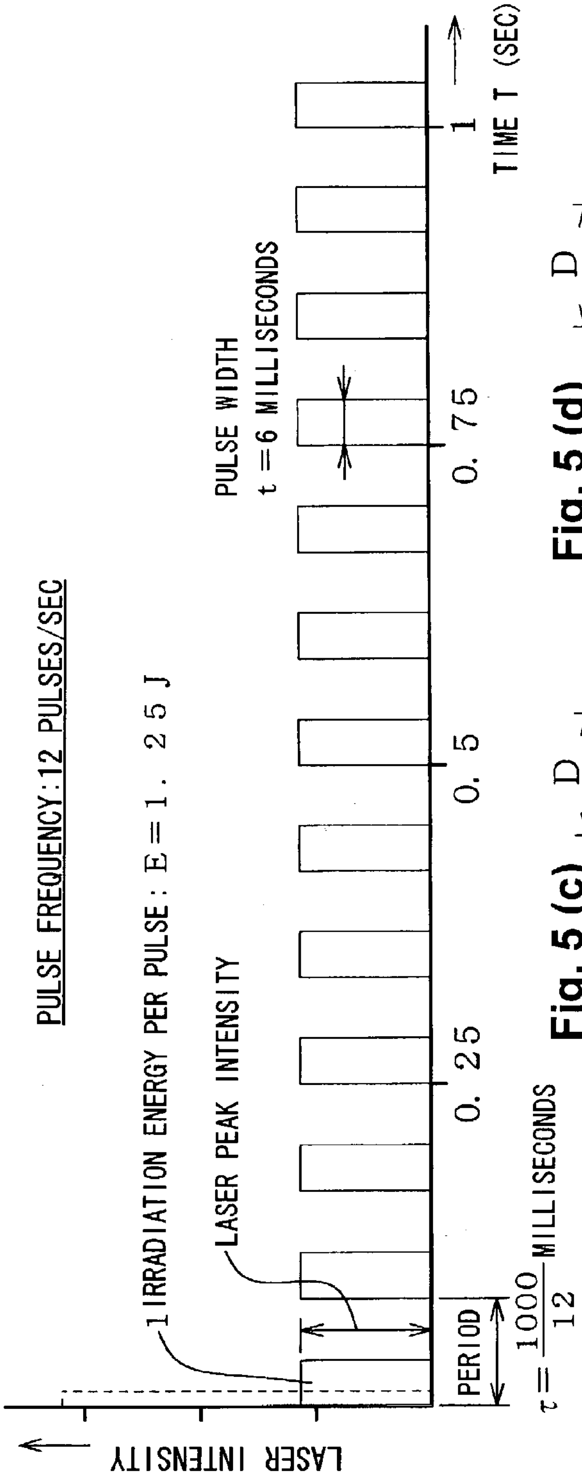
FIG. 5(*a*) is a laser beam irradiation intensity diagram.
Figure 5:
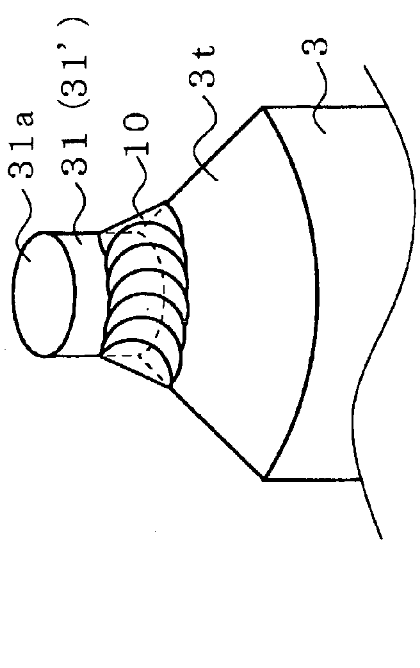
Figure 5:
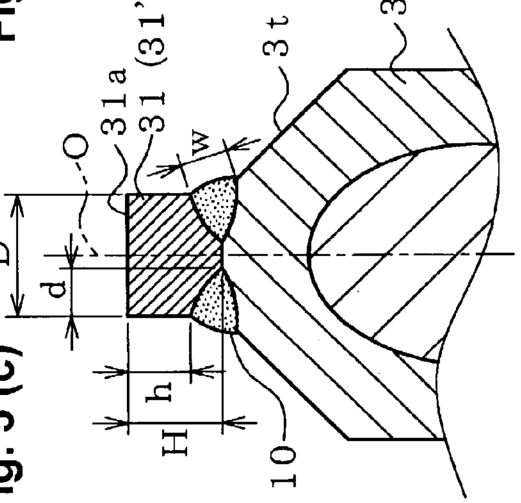
Figure 5:
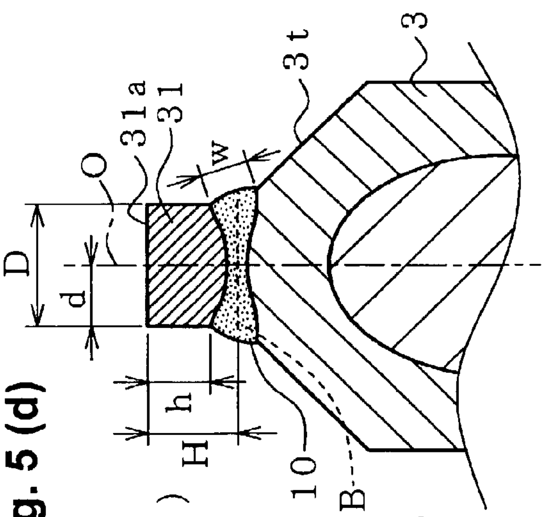

The laser beam LB is emitted from the optical emission section 50 of the laser beam irradiation unit 200, for example, in a pulsing form at a pulse frequency f of 12 pulses/sec (may be expressed in pps; period $\tau$=1,000/12 milliseconds in this case) as shown in the laser beam irradiation intensity diagram of FIG. 5(*a*). The pulsed laser beam LB of FIG. 5(*a*) is adjusted so as to assume, for example, irradiation energy per pulse E of 1.25 J and a pulse width t of 6 milliseconds. Therefore, in this case, the average laser output per second P is calculated as E×f =1.25 J×12 pps=15W.

The thus-adjusted pulsed laser beam LB is irradiated to the chip-attached assembly 70 (the noble metal chip 31') along its outer circumferential surface (see FIG. 2), thereby forming the full-circled laser-beam weld metal portion 10. The full-circled laser beam welded metal portion 10 has a penetration depth d and the weld metal width w as shown in FIGS. 5(*b*) and 5(*c*) along the circumferential direction of the noble metal chip 31'. In this way, the metal welded portion intrudes into the noble metal chip 31' and into a diameter-reduced distal end portion of the center electrode 3 having the tapered surface 3*t* and not reach the discharge face 31*a* with respect to the thickness direction of the noble metal chip 31'. As a result of formation of the full-circled laser-beam weld metal portion 10, the spark portion 31 having the discharge face 31*a* is formed on the noble metal chip 31', and the spark portion thickness h is the shortest distance between the peripheral edge of the discharge face 31a and the corresponding end edge of the full-circled laser-beam weld metal portion 10.

As shown in FIG. 5(*c*), when the full-circled laser-beam weld metal portion 10 is radially discontinuous (in this case, the full-circled laser-beam weld metal portion 10 assumes a ring-like shape), the chip thickness H and the penetration depth d may be actually measured after welding on an axial section of the noble-metal spark portion 31 including the axis O. However, as shown in FIG. 5(*d*), when the full-circled laser-beam weld metal portion 10 is radially continuous (the full-circled laser-beam weld metal portion 10 assumes a disklike shape), the chip thickness H and the penetration depth d cannot be measured after welding on the axial section. However, the penetration depth d can be the chip radius assuming that, on the axial section of the full-circled laser-beam weld metal portion 10, the full-circled laser-beam weld metal portion 10 is symmetrical with respect to the axis O. The thickness H of the chip is obtained as described below, assuming that the full-circled laser-beam weld metal portion 10 is a fused alloy portion in which the metal of the noble metal chip and the base metal of the center electrode are homogeneously distributed along the circumferential direction.

On an arbitrary axial section of the noble-metal spark portion 31 including the axis O, the average composition of the full-circled laser-beam weld metal portion 10 is obtained by means of EPMA or the like. On the basis of the obtained average composition, the mixing ratio between the metal of the noble metal chip 31' and the base metal of the center electrode 3 is calculated. Then the boundary position (see the boundary line B of FIG. 5(*d*)) is where the thickness of the full-circled laser-beam weld metal portion 10 as measured on the axis O is divided according to the calculated mixing ratio. The axial distance between the discharge face 31*a* and the boundary line B is defined as the chip thickness H.

As mentioned above, the pulsed laser beam LB is adjusted so as to assume, for example, an irradiation energy per pulse E of 1.25 J and a pulse width t of 6 milliseconds. The GI-type fiber optic cable 61 serves as the optical transmission path 60 extending between the laser beam generator 40 and the optical emission section 50. A condenser for the pulsed laser beam LB consists of the group of spherical-aberration correction lenses 51, thereby adjusting the laser beam spot diameter df to, for example, 0.47 mm. Through these adjustments, the full-circled laser-beam weld metal portion 10 is formed such that the ratio d/w between the penetration depth d and the weld metal width w is adjusted to greater than 0.55. As a result, the weld metal width w is decreased, while the penetration depth d is increased. Thus, the weld strength becomes sufficiently high, so that an oxide scale is unlikely to develop in the course of long-term use. Preferably, the upper limit of d/w is about 1.

Since the full-circled laser-beam weld metal portion 10 is formed such that the weld metal width w is relatively narrow, the ratio h/H between the spark portion thickness h and the chip thickness H can be adjusted to not less than 0.50, which means that the spark portion thickness h remains relatively thick even after welding. In this case, ablation of the noble-metal spark portion 31 is unlikely to involve exposure of the full-circled laser-beam weld metal portion 10 at the discharge face 31a of the noble-metal spark portion 31. Therefore, accelerated ablation of the spark portion, which would otherwise result from the exposure of the full-circled laser-beam weld metal portion 10, is suppressed, thereby enhancing the durability of the spark portion 31. Preferably, the upper limit of h/H is about 0.9.

Figure 6:
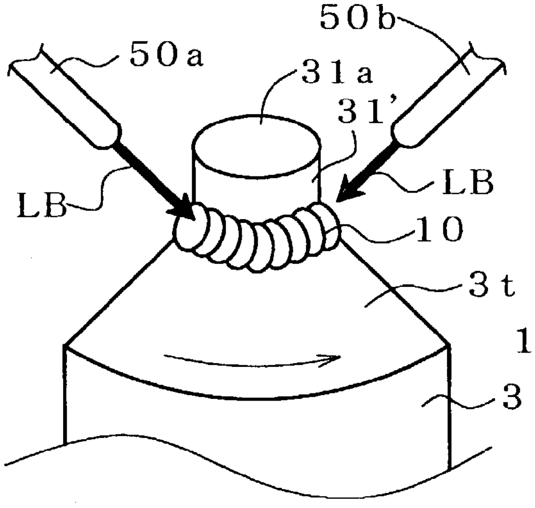
FIG. 6(*a*) is a perspective view illustrating an example of a modified manufacturing process.
Figure 6:
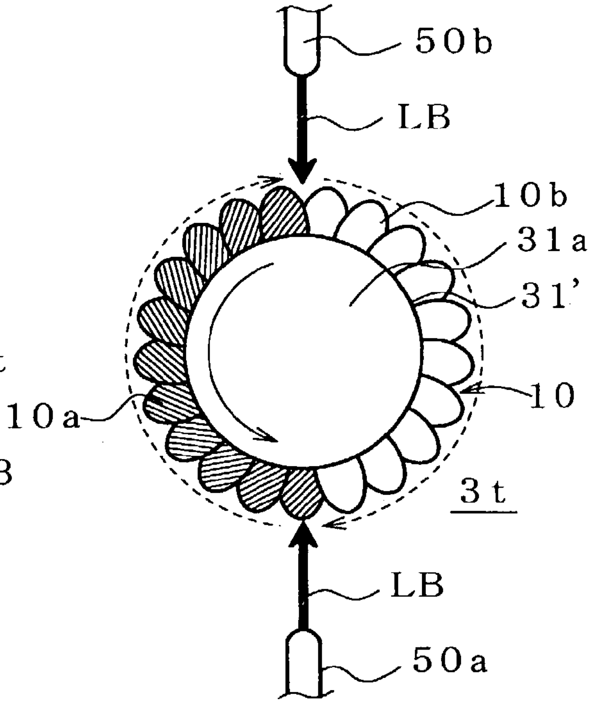
Figure 7:
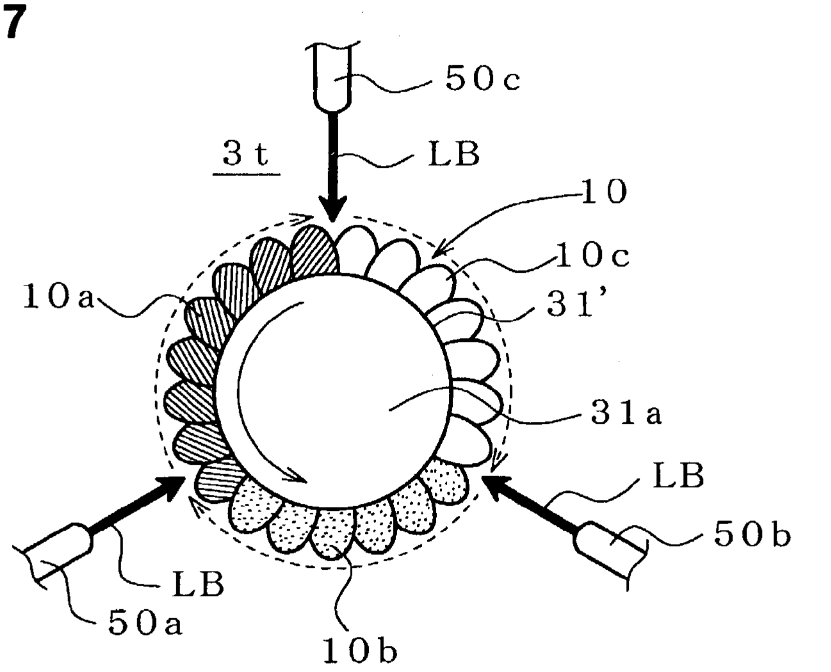
FIG. 7 is a top or plan view which illustrates a modified manufacturing process.

FIGS. 6 and 7 show modification examples of the manufacturing process of FIG. 5. As shown in FIGS. 6 and 7, a plurality of optical emission sections may be circumferentially arranged around the chip 31' at predetermined intervals for welding purpose, whereby, in some cases, welding time may be shortened. For example, as shown in FIG. 6, when two optical emission sections 50a and 50*b* are arranged at substantially 180° intervals for welding purpose, the laser beam sources 50*a* and 50*b* may respectively be engaged in forming weld metal portions 10*a* and 10*b*, which each correspond to substantially half the circumference. Alternatively, as shown in FIG. 7, when three optical emission sections 50*a* to 50*c* are arranged at substantially 120° intervals for welding purpose, the optical emission sections 50*a* to 50*c* may respectively be engaged in forming weld metal portions 10*a* to 10*c*, which each correspond to substantially one-third the circumference.

When a plurality of optical emission sections are to be used, each of the optical emission sections may conform to the laser beam welding conditions of the present invention, for the reason described below. When a plurality of optical emission sections (n optical emission sections: n>2) are used the temperature rise at the chip 31' is the result of simultaneous irradiation of laser beams. However, as mentioned previously, each of the optical emission sections may be engaged in forming a weld metal portion corresponding to 1/n the circumference of the chip 31'. Therefore, welding time can be reduced to 1/n that in the case of using a single optical emission section As a result, the time of heat input to the chip 31' is shortened. Therefore, it is unlikely that the width of each weld metal portion will increase. Further, as a result of simultaneous irradiation of laser beams by use of a plurality of optical emission sections, welding time can be shortened, thereby contributing to the enhancement of production efficiency.

Figure 8:
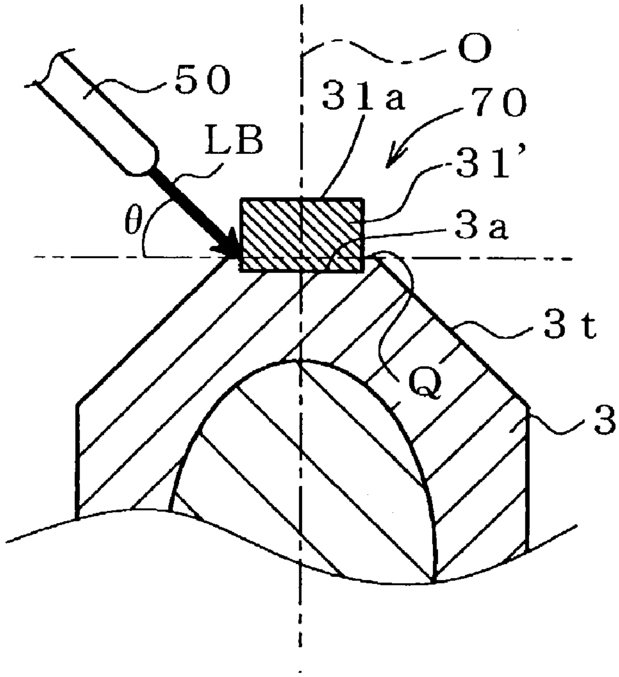
FIG. 8 is a schematic illustration for explaining a process for manufacturing a spark plug having a modified distal end portion of the center electrode shown in FIG. 2.

In order to facilitate the positioning and firm attachment of the noble metal chip 31' to a chip joint face, as shown in FIG. 8, a positioning recess 3*a* which is shaped in such a manner as to receive the noble metal chip 31' may be formed on the chip joint face, whereby the noble metal chip 31' can be fitted into the positioning recess 3*a* to thereby form the chip-attached assembly 70. In this case, in order to reliably carry out welding, the pulsed laser beam LB may be irradiated toward the boundary edge Q between the opening edge of the recess 3*a* and the outer circumferential surface of the noble metal chip 31' at an irradiation angle θ of −5° to +60° (e.g., 45°).

Figure 9:
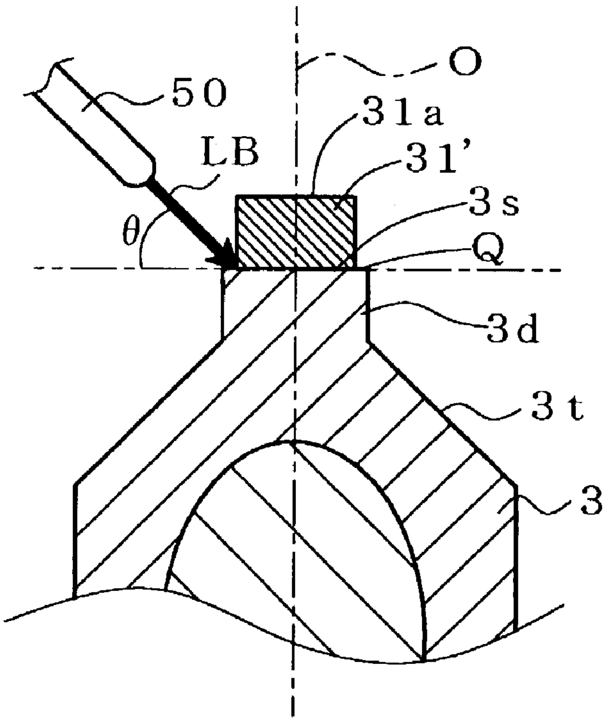
FIG. 9 is a schematic illustration of a process for manufacturing a spark plug having a further modified distal end portion of the center electrode of FIG. 2.

Alternatively, the method of FIG. 9 may be employed. Specifically, a cylindrical protrusion 3*d* is formed at a distal end portion of the center electrode 3 having the tapered surface 3*t*. The noble metal chip 31' is attached to a flat, distal end face 3*s* of the protrusion 3*d*, the face 3*s* serving as a chip joint face; and the pulsed laser beam LB is irradiated toward the boundary edge Q between the chip joint face and the outer circumferential surface of the noble metal chip 31' at an irradiation angle θ of −5° to +60° (e.g., 45°).

Figure 10:
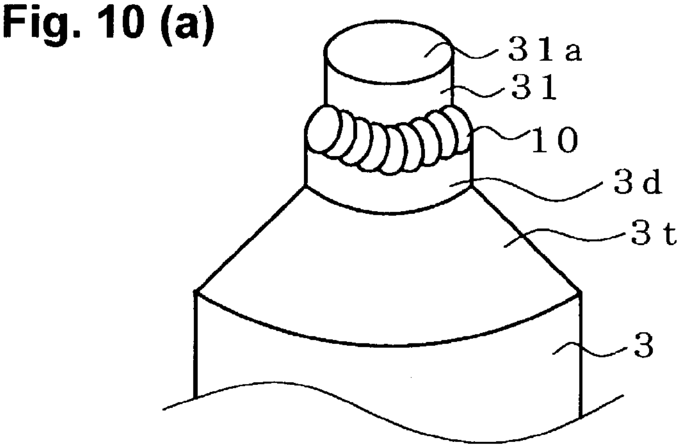
FIG. 10(*a*) is a perspective view showing a main portion of a spark plug manufactured by the manufacturing process of FIG. 9.
Figure 10:
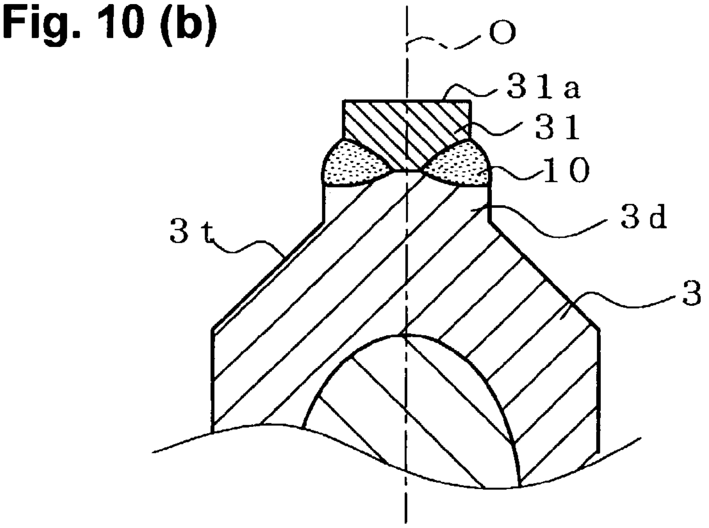
Figure 10:
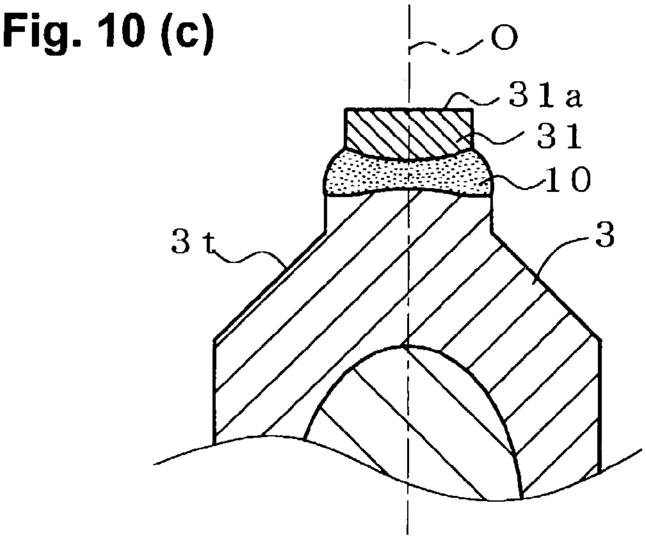

FIG. 10(*a*) is an enlarged perspective view of the spark portion 31 and its peripheral portion of a spark plug as manufactured according to the above procedure. FIGS. 10(*b*) and 10(*c*) are vertical sectional views of the spark portion 31 and its peripheral portion of FIG. 10(*a*). FIG. 10(*b*) shows a case where the weld metal portion 10 is radially discontinuous, and FIG. 10(*c*) shows a case where the weld metal portion 10 is radially continuous.

Figure 11:
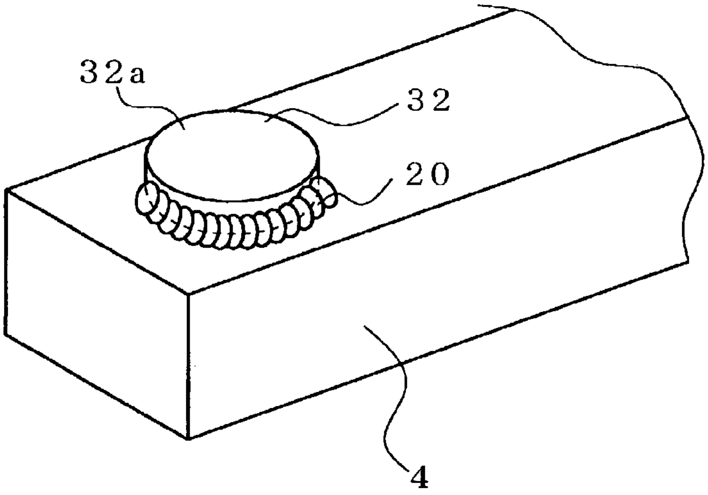
FIG. 11 is a perspective view showing the spark portion of a ground electrode.

FIG. 11 shows the spark portion 32 formed on the ground electrode 4 and having a discharge face 32*a*. As in the case of the center electrode 3, the full-circled laser-beam weld metal portion 20 is formed.

As shown in FIG. 12(*a*), a side surface of the ground electrode 4 faces the spark discharge gap g (FIG. 1) and serves as a chip joint face, on which a recess 4*a* is formed. The noble metal chip 32' is fitted into the recess 4*a*. Then, as in the case of FIG. 5 or the like, the full-circled laser-beam weld metal portion 20 is formed by use of the optical emission section 50 of the laser beam irradiation unit 200 (FIG. 3).

In order to confirm the effect of the present invention, the test described below was conducted. First, by use of INCONEL 600, the center electrodes 3 as shaped in FIG. 2 were manufactured while having the dimensions of FIG. 2(*a*) as follows: body diameter D1 2.5 mm; distal end face diameter D2 1.3 mm; and taper angle of tapered surface 3*t* 45°. Noble metal chips each having a thickness H of 0.6 mm and a diameter D of 0.8 mm were blanked out from an Ir-5 wt% Pt alloy plate, which had been formed through alloying and rolling.

Next, in Test Nos. 1 to 10 of Table 1, which will be described later, the pulsed YAG laser beam LB was irradiated along the outer circumferential surface of the noble metal chip 31' attached to the center electrode 3 to thereby form the full-circled laser-beam weld metal portion 10. The pulsed YAG laser beam LB was adjusted as shown in the laser beam irradiation intensity diagram of FIG. 5(*a*).

Specifically, the pulse width t was set to 6 milliseconds; irradiation energy per pulse was adjusted so as to obtain a penetration depth as specified in Table 1 for each Test No.; and the pulse frequency f was 12 pps (period τ=1,000/12 milliseconds). Whether or not spatters SP were generated was observed. Also, on an axial section of the noble metal chip 31' including the axis thereof, the penetration depth d, the weld metal width w, and the spark portion thickness h were measured.

The dimensions were measured and compared between the following two groups of center electrodes 3. One group, center electrodes 3 (Test Nos. 1 to 5) was manufactured by use of the GI-type fiber optic cable 61 (the laser beam spot diameter df is 0.47 mm) as the optical transmission path 60 extended from the laser beam generator 40 to the optical emission section 50 in the laser beam irradiation unit 200.

Figure 4:
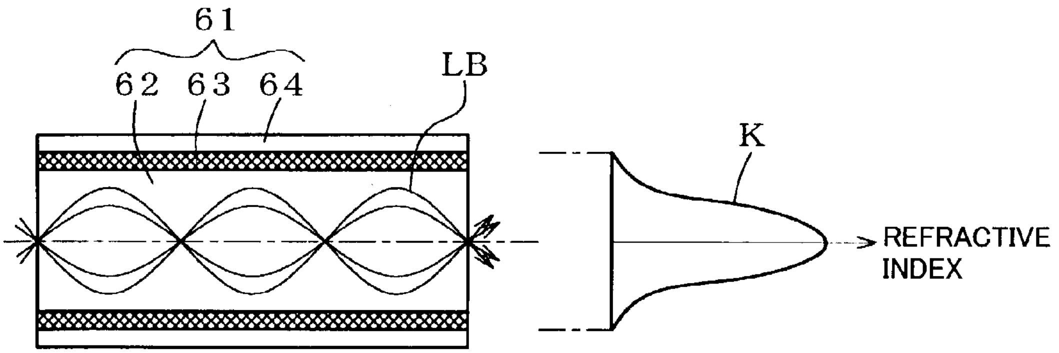
FIG. 4(*a*) illustrates a GI-type fiber optic cable.
Figure 4:
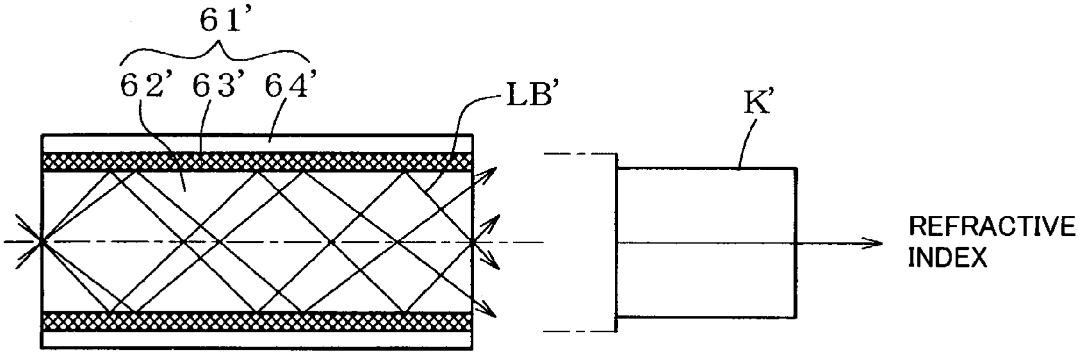

As shown FIG. 3, The other group: center electrodes 3 (Test Nos. 6 to 10) were manufactured by use of the SI-type fiber optic cable (the laser beam spot diameter df is 0.62 mm) 61' (see FIG. 4(*b*)). In manufacture of the center electrodes 3 of Test Nos. 1 to 10, the optical emission section 50 was equipped with the group of spherical-aberration correction lenses 51.

The spark plugs 100 having the corresponding center electrodes 3 of Test Nos. 1 to 10 were manufactured and subjected to the 100-hour engine-mounted durability test under the following conditions: 2,000 cc engine; engine speed 6,500 rpm; and throttle completely opened. After 100 hours, the center electrodes 3 of Test Nos. 1 to 10 were removed from the corresponding spark plugs 100 and were each subjected to etching on the axial section of the noble metal chip 31' including the axis thereof.

Figure 13:
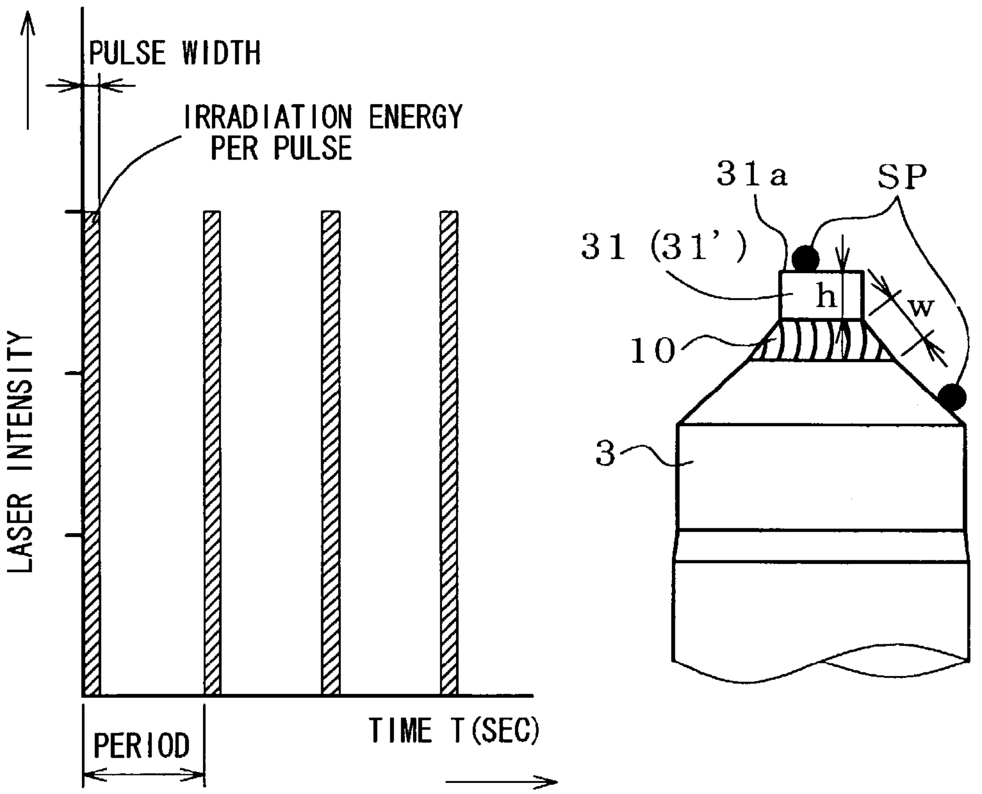
FIG. 13(*a*) is a schematic illustration of the problems involved in a conventional manufacturing method; and, FIG. 13(*b*) is a further schematic illustration of the problems involved in a conventional manufacturing method.
Figure 13:
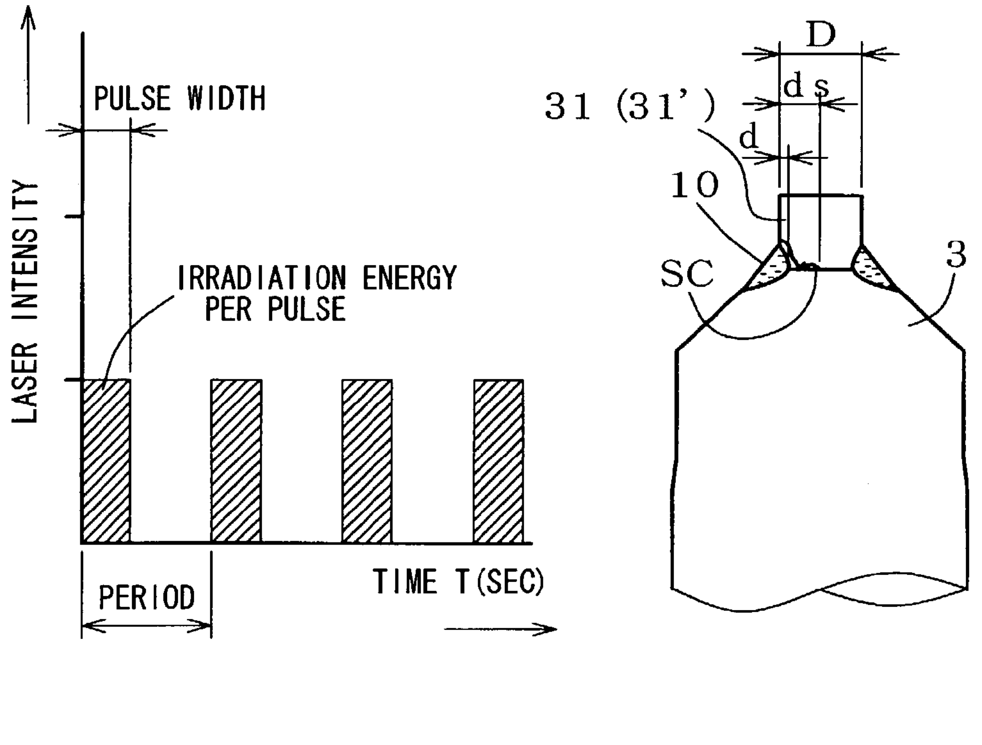

The etched sections were measured for the radial depth ds of an oxide scale SC (see FIG. 13(*b*)) in the full-circled laser-beam weld metal portion 10. The ratio ds/D between the thus-measured oxide scale depth ds and the chip diameter D was calculated to thereby obtain the oxide scale development rate. Also, the oxide scale development rates of Test Nos. 1 to 5 were expressed in terms of ratios to the oxide scale development rates of Test Nos. 6 to 10, respectively, while the oxide scale development rates of Test Nos. 6 to 10 were taken as "1." Notably, the SI-type fiber optic cable 61' was used in Test Nos. 6 to 10.

Substantially the same penetration depth d in the noble metal chip 31' was established in each of the following: Test Nos. 1 and 6, Test Nos. 2 and 7, Test Nos. 3 and 8, Test Nos. 4 and 9, and Test Nos. 5 and 10. Table 1 also shows the ratio between the oxide scale development rates of Test Nos. 1 and 5, that of Test Nos. 2 and 6, that of Test Nos. 3 and 8, that of Test Nos. 4 and 9, and that of Test Nos. 5 and 10 as well as whether or not spatters were generated.

Test Nos. 2 and 7, that between Test Nos. 3 and 8, that between Test Nos. 4 and 9, and that between Test Nos. 5 and 10, each pair having a substantially identical penetration depth d, reveal the following tendency: Test Nos. 1 to 5 (which used the GI-type fiber optic cable) showed a d/w ratio greater than 0.55 between the penetration depth d and the weld metal width w are lower in oxide scale development rate in the full-circled laser-beam weld metal portion 10 than Test Nos. 6 to 10, respectively.

The spark plug 100 (center electrode 3) whose d/w ratio between the penetration depth d and the weld metal width w in the noble metal chip 31' is greater than 0.55 (i.e., the spark plug 100 (center electrode 3) manufactured by use of the GI-type fiber optic cable) is unlikely to suffer development of oxide scale in the full-circled laser-beam weld metal portion 10, whereby the reliability thereof is enhanced. Presumably, in the spark plug 100 (center electrode 3) manufactured by use of the GI-type fiber optic cable, a noble metal chip component and a center electrode component (electrode base metal) are homogeneously dispersed in the full-circled laser-beam weld metal portion 10 as compared with the case of the spark plug 100 (center electrode 3) manufactured by use of the SI-type fiber optic cable, whereby an oxide scale is unlikely to develop. The test results of Table 1 show that, in terms of development of oxide scale in the full-scaled laser-beam weld metal portion 10, the superiority of use of the GI-type fiber optic cable to the use of the SI-type fiber optic cable increases with the penetration depth d in the noble metal chip 31'.

TABLE 1

(Chip dia. D = 0.8 mm; chip thickness H = 0.6 mm)

| Test No. | Fiber optic cable | Penetration depth d (mm) | Weld metal width w (mm) | Spark portion thickness h (mm) | d/w | h/H | Oxide scale development rate ds/D (%) | Ratio between oxide scale development rates | Spatters |
|---|---|---|---|---|---|---|---|---|---|
| 1 | GI type | 0.20 | 0.35 | 0.45 | 0.57 | 0.75 | 55 | 0.61 (1) | Absent |
| 2 | (df = 0.47 mm) | 0.26 | 0.40 | 0.45 | 0.65 | 0.75 | 22 | 0.55 (2) | Absent |
| 3 | | 0.30 | 0.38 | 0.40 | 0.82 | 0.67 | 4 | 0.18 (3) | Absent |
| 4 | | 0.35 | 0.42 | 0.40 | 0.83 | 0.67 | 0 | 0 (4) | Absent |
| 5 | | 0.40 | 0.42 | 0.40 | 0.95 | 0.67 | 0 | 0 (5) | Absent |
| 6 | SI type | 0.20 | 0.45 | 0.40 | 0.44 | 0.67 | 90 | 1 | Absent |
| 7 | (df = 0.62 mm) | 0.25 | 0.50 | 0.40 | 0.50 | 0.67 | 40 | 1 | Absent |
| 8 | | 0.28 | 0.55 | 0.35 | 0.51 | 0.58 | 22 | 1 | Present |
| 9 | | 0.33 | 0.60 | 0.30 | 0.55 | 0.50 | 7 | 1 | Present |
| 10 | | 0.40 | 0.72 | 0.40 | 0.55 | 0.42 | 7 | 1 | Present |

(1) Oxide scale development rate of No. 1 as expressed when that of No. 6 is taken as 1.
(2) Oxide scale development rate of No. 2 as expressed when that of No. 7 is taken as 1.
(3) Oxide scale development rate of No. 3 as expressed when that of No. 8 is taken as 1.
(4) Oxide scale development rate of No. 4 as expressed when that of No. 9 is taken as 1.
(5) Oxide scale development rate of No. 5 as expressed when that of No. 10 is taken as 1.

According to the test results of Table 1, the spark plugs 100 (center electrodes 3) that had been manufactured by use of the SI-type fiber optic cable showed the presence of spatters, whereas the spark plugs 100 (center electrodes 3) which had been manufactured by use of the GI-type fiber optic cable were free of spatters. The test results of Table 1 also show that, in terms of generation of spatters, the superiority of use of the GI-type fiber optic cable to use of the SI-type fiber optic cable increases with the penetration depth d in the noble metal chip 31'.

According to the test results of Table 1, in each of Test Nos. 1to 5, which used the GI-type fiber optic cable, the ratio d/w between the penetration depth d and the weld metal width w was greater than 0.55; i.e., greater than the ratios d/w in Test Nos. 6 to 10, which used the SI-type fiber optic cable. Comparison between Test Nos. 1 and 6, that between Description of Reference Numerals

3: center electrode
3*s*: chip joint face
4: ground electrode
10, 20: full-circled laser-beam weld metal portion
31, 32: noble-metal spark portion
31', 32': noble metal chip
31*a*, 32*a*: discharge face
40: laser beam generator

50: optical emission section
51: group of spherical-aberration correction lenses
60: optical transmission path
61: GI-type fiber optic cable
62: core
70: chip-attached assembly
100: spark plug
200: laser-beam irradiation unit
LB: pulsed laser beam While the invention has been described in connection with its preferred embodiments, it should be recognized that changes and modifications can be made therein without departing from the scope of the appended claims.

What is claimed is:

1. A method for manufacturing a spark plug comprising the steps of:

providing a noble metal chip, a center electrode having a distal end face and a ground electrode having a side surface facing the distal end face of the center electrode;

laser-beam-welding the noble metal chip to one of the center electrode and the ground electrode at a position corresponding to a spark discharge gap to form a noble-metal spark portion having a discharge face;

the method characterized by;

forming a chip joint face portion on one of the electrodes from a heat-resistant alloy predominately containing Ni or Fe and attaching the noble metal chip to the chip joint face to thereby form a chip attached assembly;

providing a laser beam generator and a grated-index- type fiber optic cable having a core and an optical emissions section; and, forming a full circled laser-beam weld metal portion on the chip-attached assembly along a circumferential direction of the noble metal chip to intrude into the noble metal chip and into the chip joint face formation portion without reaching the discharge face with respect to a thickness direction by irradiating the noble metal chip and chip joint face formation portion without reaching the discharge face by irradiating the chip attached assembly with a laser beam generator and transmitting a laser beam through the core of the fiber optic cable and the emissions section while condensed by the optical emissions section.

2. A method for manufacturing a spark plug in accordance with claim 1, wherein the emission section of the grated-index-type fiber optic cable includes a group of spherical-aberration correction lenses and the laser beam transmitted through and emitted from the grated-index-type fiber optic cable is condensed by the group of spherical-aberration correction lenses.

3. A method for manufacturing a spark plug in accordance with claim 2, wherein the laser beam transmitted through and emitted from the graded-index-type fiber optic cable is condensed in the optical emission section to produce a laser beam spot diameter of 0.6 mm or less.

4. A method for manufacturing a spark plug in accordance with claim 3, in which the laser beam irradiates the chip attached assembly in a pulsed form at an irradiation energy per pulse of 0.5–2.5 J and a pulse width of 3–8 milliseconds.

5. A method for manufacturing with claim 4, in which the chip attached assembly is irradiated at a pulse frequency of 2–30 pulses per second.

6. A method for manufacturing with claim 3, in which the chip attached assembly is irradiated at a pulse frequency of 2–30 pulses per second.

7. A method for manufacturing a spark plug in accordance with claim 2, in which the laser beam irradiates the chip attached assembly in a pulsed form at an irradiation energy per pulse of 0.5–2.5 J and a pulse width of 3–8 milliseconds.

8. A method for manufacturing with claim 7, in which the chip attached assembly is irradiated at a pulse frequency of 2–30 pulses per second.

9. A method for manufacturing with claim 2, in which the chip attached assembly is irradiated at a pulse frequency of 2–30 pulses per second.

10. A method for manufacturing a spark plug in accordance with claim 1, wherein the laser beam transmitted through and emitted from the graded-index-type fiber optic cable is condensed in the optical emission section to produce a laser beam spot diameter of 0.6 mm or less.

11. A method for manufacturing a spark plug in accordance with claim 3, in which the laser beam irradiates the chip attached assembly in a pulsed form at an irradiation energy per pulse of 0.5–2.5 J and a pulse width of 3–8 milliseconds.

12. A method for manufacturing with claim 11, in which the chip attached assembly is irradiated at a pulse frequency of 2–30 pulses per second.

13. A method for manufacturing with claim 10, in which the chip attached assembly is irradiated at a pulse frequency of 2–30 pulses per second.

14. A method for manufacturing a spark plug in accordance with claim 1, in which the laser beam irradiates the chip attached assembly in a pulsed form at an irradiation energy per pulse of 0.5–2.5 J and a pulse width of 3–8 milliseconds.

15. A method for manufacturing with claim 14, in which the chip attached assembly is irradiated at a pulse frequency of 2–30 pulses per second.

16. A method for manufacturing a spark plug in accordance with claim 1, in which the chip attached assembly is irradiated at a pulse frequency of 2–30 pulses per second.

17. A method for manufacturing a spark plug comprising the steps of:

providing a noble metal chip, a center electrode having a distal end face and a ground electrode having a side surface facing the distal end face of the center electrode;

laser-beam-welding the noble metal chip to one of the center electrode and the ground electrode at a position corresponding to a spark discharge gap to form a noble-metal spark portion having a discharge face;

the method characterized by;

forming a chip joint face portion on one of the electrodes from a heat-resistant alloy predominately containing Ni or Fe and attaching the noble metal chip to the chip joint face to thereby form a chip attached assembly;

providing a laser beam generator and a grated-index- type fiber optic cable having a core and an optical emissions section; and, forming a full circled laser-beam weld metal portion on the chip-attached assembly along a circumferential direction of the noble metal chip to intrude into the noble metal chip and into the chip joint face formation portion without reaching the discharge face with respect to a thickness direction by irradiating the noble metal chip and chip joint face formation portion without reaching the discharge face by irradiating the chip attached assembly with a laser beam generator and transmitting a laser beam through the core of the fiber optic cable and the emissions section while condensed by the optical emissions section, wherein said noble metal spark portion includes an axis and wherein d/w is adjusted to greater than 0.55 where d represents a penetration depth of said full circle laser-beam weld metal portion and w represents a weld metal width of said full-circle laser-beam weld metal portion.

18. The method for manufacturing a spark plug according to claim 17, further comprising the step of adjusting h/H to not less than 0.5, wherein H is the thickness of said noble metal chip as measured along a direction of said axis of said center electrode, h is a spark portion thickness equal to the shortest distance measured between a peripheral edge of said discharge face and a corresponding edge of said full-circle laser-beam weld metal portion.

* * * * *